United States Patent
Schwartz

Patent Number: 6,016,342
Date of Patent: Jan. 18, 2000

[54] TELECOMMUNICATIONS APPARATUS FOR INITIATING CALLS BASED ON PAST CALLING PATTERNS

[75] Inventor: Alan Ira Schwartz, Bridgewater, N.J.

[73] Assignee: AT&T Corp., New York, N.Y.

[21] Appl. No.: 08/878,358

[22] Filed: Jun. 18, 1997

[51] Int. Cl.[7] .................................................. H04M 3/48
[52] U.S. Cl. ........................ 379/209; 379/216; 379/355
[58] Field of Search .................................. 379/201, 207, 379/216, 265, 266, 309, 355, 904, 209, 211, 356

[56] References Cited

U.S. PATENT DOCUMENTS

| | | | |
|---|---|---|---|
| 5,155,763 | 10/1992 | Bigus et al. | 379/309 X |
| 5,533,100 | 7/1996 | Bass et al. | 379/209 |
| 5,568,546 | 10/1996 | Marutiak | 379/355 |
| 5,590,189 | 12/1996 | Turnbull et al. | 379/355 |
| 5,625,683 | 4/1997 | Nazanin et al. | 379/355 |
| 5,636,267 | 6/1997 | Utsumi et al. | 379/355 |
| 5,646,988 | 7/1997 | Hikawa | 379/266 |
| 5,742,674 | 4/1998 | Jain et al. | 379/209 |
| 5,796,816 | 8/1998 | Utsumi | 379/355 |
| 5,799,077 | 8/1998 | Yoshii | 379/209 |
| 5,859,901 | 1/1999 | Brendzel et al. | 379/355 X |

Primary Examiner—Scott Wolinsky

[57] ABSTRACT

A method of initiating telephone calls for a calling party to called parties based on past calling patterns is characterized by the steps of monitoring telephone calls made over a period of time; identifying calling patterns based on the telephone calls; and placing a telephone call based on the calling patterns. The method thus learns and anticipates telephone calls based on monitoring the calling party's calling patterns over a given time period.

12 Claims, 2 Drawing Sheets

TELECOMMUNICATIONS APPARATUS FOR INITIATING CALLS BASED ON PAST CALLING PATTERNS

BACKGROUND OF THE INVENTION

1. Technical Field

This invention generally relates to telecommunications networks and, more specifically, to a telecommunications apparatus and method that monitors calling patterns of callers to identify repetitive calls made over time. Based on calling patterns, the telecommunications apparatus and method can anticipate when a caller wishes to place a call to a particular destination and then initiate the call for the caller.

2. Description of Related Art

Telephone service is currently provided to the public by means of switching offices. Referring to FIG. 1, there is shown an exemplary telecommunications network 100 for processing calls. Local switching offices, for example, local switching offices 102a, 102b, 102c are connected to each other by direct trunks 106a, 106b. That is, a direct trunk 106a connects two local switching offices 102a and 102b so as to route calls from a telephone 108a or 108b served by the local switching office 102a to a telephone 108c served by the terminating local switching office 102b. In large service areas, tandem switching offices, for example, tandem switching offices 110a and 110b connect multiple local switching offices 102a, 102b, 102c, and 104a, 104b, respectively, via tandem trunks 112b, 112c, 112d, and 112f, 112g. That is, the tandem trunks 112 connect the local switching offices 102, 104 so as to route calls from any one local switching office to any other local switching offices.

Toll switches 114a, 114b and toll trunks 118a, 118b, 118c, 118d are used to connect tandem switching offices 110a, 110b that are separated geographically or politically in the same way that tandem switching offices 110 and tandem trunks 112 are used to connect local switching offices 102 and 104 in the same area. In the U.S., service within local access and transport areas (LATAs), corresponding to major metropolitan areas or entire states, is furnished by local telephone exchange carriers (LECs), for example, Bell Atlantic-NYNEX or Bell South; between LATAs, service is provided by several competing interexchange carriers (IXCs), for example, AT&T, MCI, and Sprint. The networks of the IXCs connect to those of the local companies at access tandems, through which calls into or out of the LATAs are routed.

The current telephone carriers, however, do not monitor or identify calling patterns of customers made over time such that the calls can be automatically placed for the customers based on the calling patterns. Accordingly, there exists a need for an apparatus and method for monitoring the calling patterns of callers to identify repetitive calls made over time and, based on such calling patterns, the apparatus and method can anticipate when a caller wishes to place a call to a particular destination and then initiate the call for the caller.

SUMMARY OF THE INVENTION

The need cited above is substantially provided through provisions of the apparatus and methods disclosed herein.

A method according to the present invention of initiating telephone calls for a calling party to called parties based on past calling patterns is characterized by the steps of monitoring telephone calls made over a period of time; identifying calling patterns based on the telephone calls; and placing a telephone call based on the calling patterns.

Another method according to the present invention of initiating telephone calls for a calling party to called parties is characterized by the steps of monitoring telephone calls made over a period of time; creating a list of scheduled telephone calls; and placing a telephone call based on the list of scheduled telephone calls.

An apparatus according to the present invention for initiating telephone calls for a calling party to called parties based on past calling patterns comprises a means for monitoring telephone calls made over a period of time; a means for identifying calling patterns based on the telephone calls; and a means for placing a telephone call based on the calling patterns.

These and other features of the present invention will become clear from reading the detailed description of the drawings which follows.

DETAILED DESCRIPTION

Today, many functions performed over the telephone network by residence customers have become repetitive in nature, i.e., the same call or calls are made to the same telephone number or numbers at specific times each day, week or month. In each instance the customer physically places the call over the AT&T Switched Network (ASN) (or any public switched telephone network) and the ASN is viewed by the caller as an inanimate object activated by the caller. The present invention provides the ASN with the ability to monitor the calling patterns of the customer (learn) and based on an identified calling pattern(s), will place the call for the customer (anticipate) based on monitoring the customer's calling patterns over a given time period. The ASN may comprise a local switch, a tandem switch, a toll switch adjunct processor, or other long distance or local toll at which the method of the present invention may be implemented. The above method is referred to as Dial 1 Anticipate and Learn.

As an example, say caller A calls his mother in Florida each Tuesday and Thursday evening at approximately 7:00 PM every week throughout the year. The ASN in accordance with the present invention would monitor this calling pattern over a period of time and then begin placing those calls for caller A at approximately 7:00 PM each Tuesday and Thursday. The ASN would dial caller A, a prompt would be played stating, for example, "We are attempting to dial your scheduled call to xxx-xxx-xxxx, if you wish to proceed, press 1 now, otherwise please hang-up." If the call is placed and the called number is busy or RNA (ring-no-answer), then the ASN would prompt caller A with, for example, "We cannot complete your call now, to leave a message, press 1, to have AT&T continue trying to reach your party, press 2."

If upon receiving the prompt "We are attempting to dial your scheduled call . . . " and the customer elects not to proceed with the call x consecutive times, then the ASN will remove that call from the anticipate list which may be stored in any appropriate processor as described above, for example, a 4E or adjunct database. The call number can be automatically reinstated, however, on the anticipate list by the customer making repetitive calls to that number and the ASN monitoring the calling pattern as defined above.

As an alternative to having the ASN monitor the customer's calling pattern, the customer can be given access to the anticipate list and allowed to manage the anticipate list to add or delete calls without waiting for the ASN to learn a particular calling pattern. In effect, the customer will establish a list of telephone numbers by date and time that he wants the ASN to act on.

Figure 1:
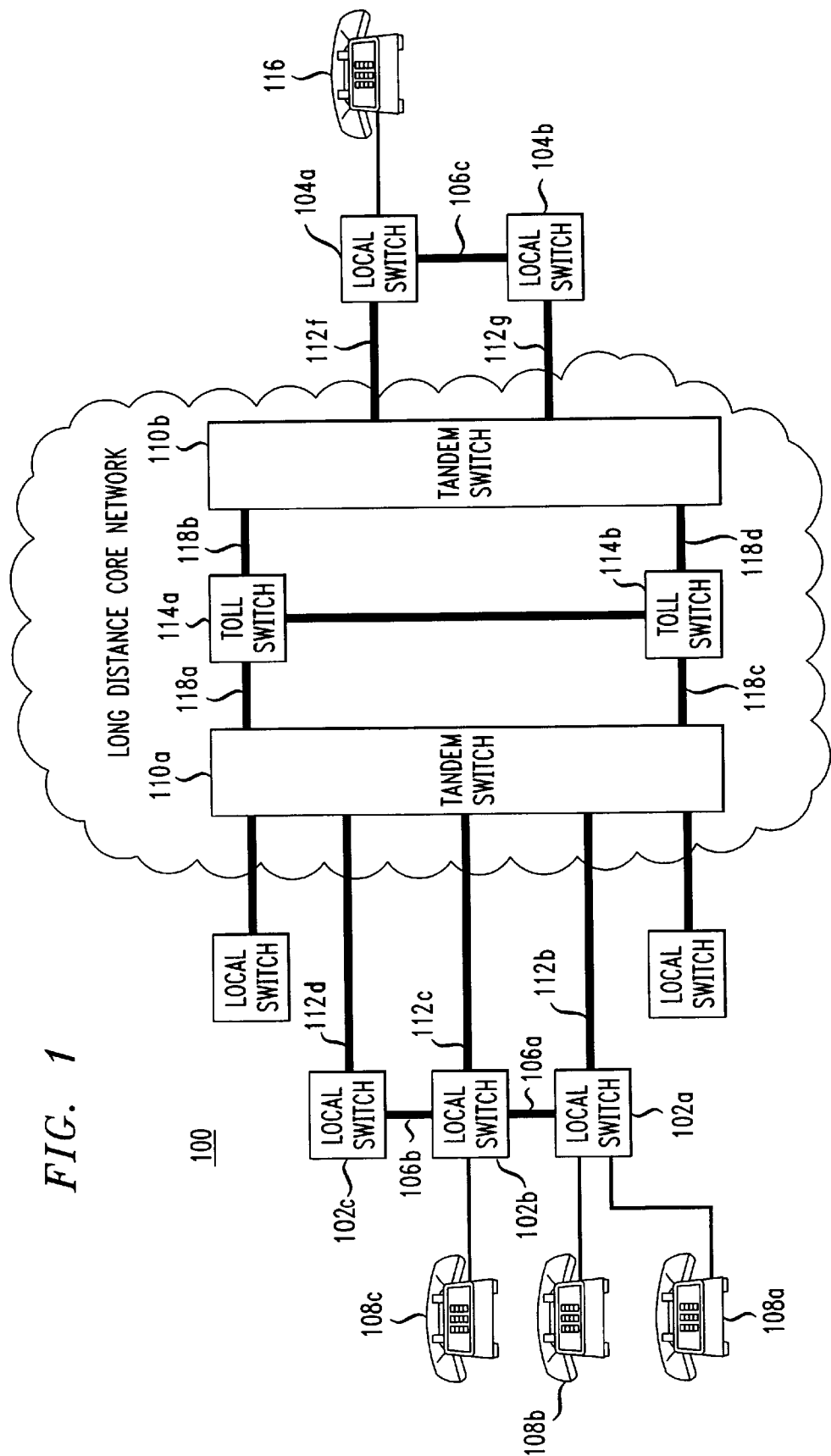
FIG. 1 shows an exemplary telecommunications network for processing calls.
Figure 2:
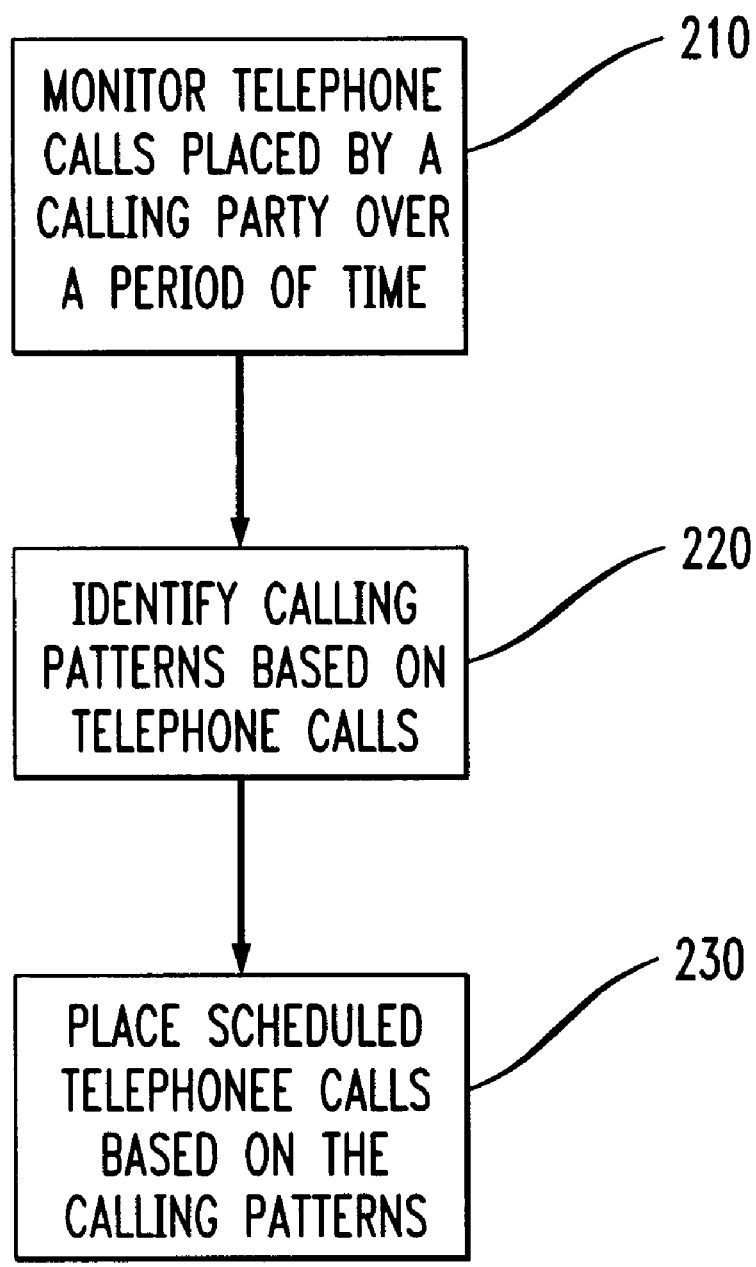
FIG. 2 is a flow chart of a method of initiating telephone calls in accordance with the principles of the present invention.

Referring to FIG. 2, there is shown a flow chart of a method of initiating telephone calls for a calling party in accordance with the principles of the present invention. At step 210, the ASN monitors telephone calls made by a calling party to called parties over a period of time. At step 220, the ASN identifies and learns the calling party's calling patterns based on the telephone calls to the called parties. Finally, at step 230, the ASN places a telephone call to a called party based on the calling patterns. The method thus learns and anticipates telephone calls based on monitoring the calling party's calling patterns over a given time period.

While the invention has been described in detail with reference to a preferred embodiment and selected variations thereof, it should be apparent to those skilled in the art that many modifications and variations are possible without departure from the scope and spirit of this invention as defined in the appended claims.

I claim:

1. A method of initiating telephone calls for a calling party to called parties, comprising steps of:

monitoring telephone calls placed by the calling party over a period of time;

identifying a repetitive calling pattern based on the monitored telephone calls; and prompting the calling party to determine whether the calling party wishes to proceed with placing a scheduled telephone call that is based on the calling pattern.

2. The method of claim 1, further comprising the step of receiving a signal not to proceed with placing the scheduled telephone call.

3. The method of claim 3, wherein the signal not to proceed is a hang-up signal.

4. The method of claim 1, further comprising the step of receiving a signal to proceed with placing the scheduled telephone call.

5. The method of claim 4, wherein the signal to proceed is a stay on the line of a predetermined period of time.

6. The method of claim 5, further comprising the step of prompting the calling party to leave a message for the called party if the scheduled telephone call cannot be completed.

7. A method of initiating telephone calls for a calling party to called parties, comprising steps of:

monitoring telephone calls placed by the calling party over a period of time;

identifying a repetitive calling pattern based on the monitored telephone calls; and removing a scheduled telephone call from a list that is based on the calling pattern if the calling party elects not to proceed with the scheduled telephone call x consecutive times.

8. The method of claim 7, further comprising the step of reinstating the scheduled telephone call if the calling party makes repetitive calls to that telephone number.

9. A method of initiating telephone calls for a calling party to called parties, comprising steps of:

monitoring telephone calls placed by the calling party over a period of time;

identifying a repetitive calling pattern based on the monitored telephone calls; and placing a scheduled telephone call based on the calling pattern, wherein all of the method steps are implemented by one of a local switch, a tandem switch and a toll switch.

10. A method of initiating telephone calls for a calling party to called parties, comprising steps of:

monitoring telephone calls placed by the calling party over a period of time;

creating a list of scheduled telephone calls based on the monitored telephone calls;

placing a telephone call based on the list of scheduled telephone calls; and adding a telephone call to the list of scheduled telephone calls based on a request from the calling party.

11. A method of initiating telephone calls for a calling party to called parties, comprising steps of:

monitoring telephone calls placed by the calling party over a period of time;

creating a list of scheduled telephone calls based on the monitored telephone calls;

placing a telephone call based on the list of scheduled telephone calls; and deleting a telephone call from the list of scheduled telephone calls based on a request from the calling party.

12. A method of initiating telephone calls for a calling party to called parties, comprising steps of:

monitoring telephone calls placed by the calling party over a period of time;

creating a list of scheduled telephone calls based on the monitored telephone calls;

placing a telephone call based on the list of scheduled telephone calls; and wherein the scheduled telephone calls are placed according to a scheduled date and time.

\* \* \* \* \*